(No Model.) 3 Sheets—Sheet 2.
E. YERKES & C. DENN.
MACHINE FOR MAKING AXES.
No. 317,320. Patented May 5, 1885.
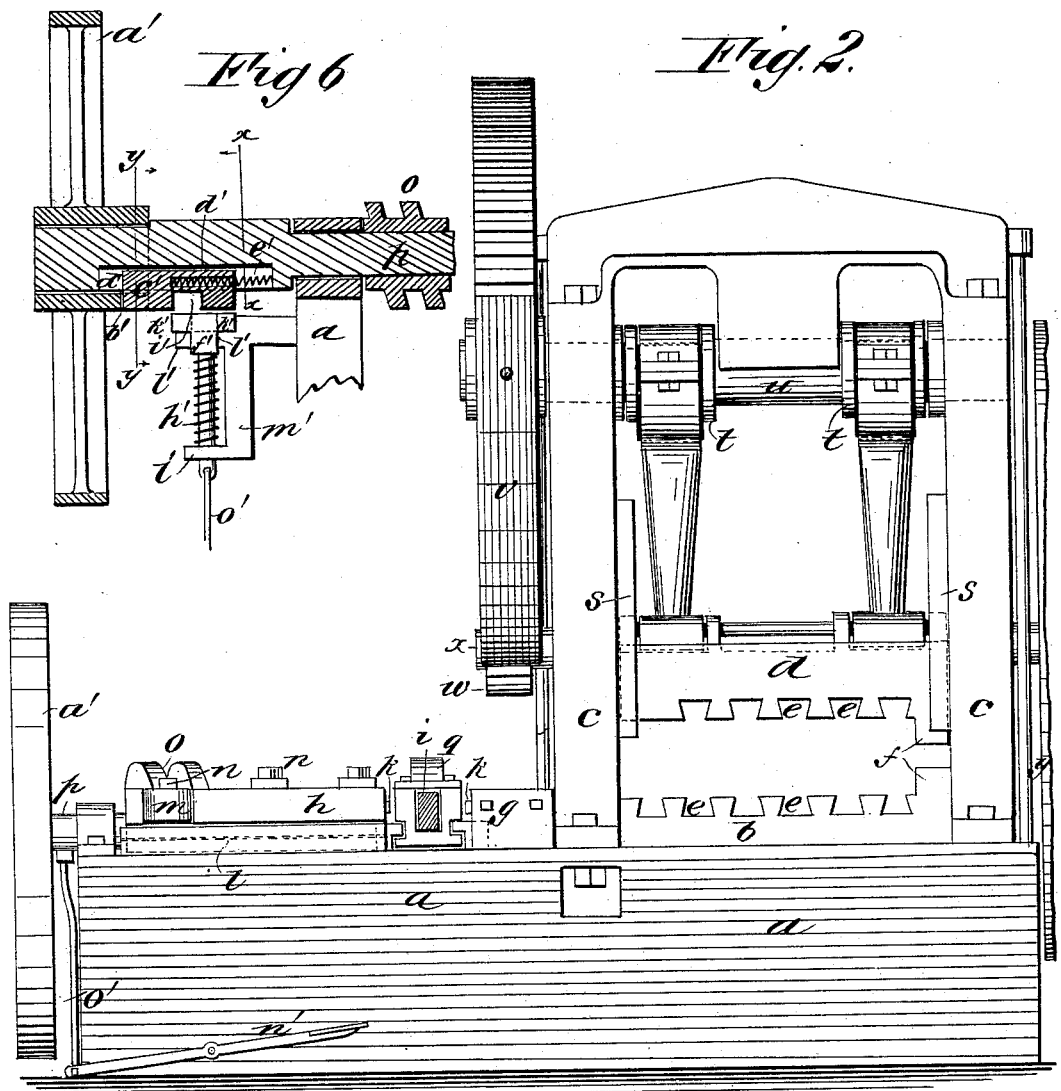
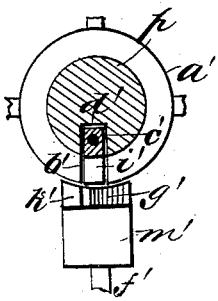
WITNESSES:
F. McArdle.
Chas. Lurcott.
INVENTOR:
Clayton Denn
Edward Yerkes
BY Munn & Co.
ATTORNEYS.

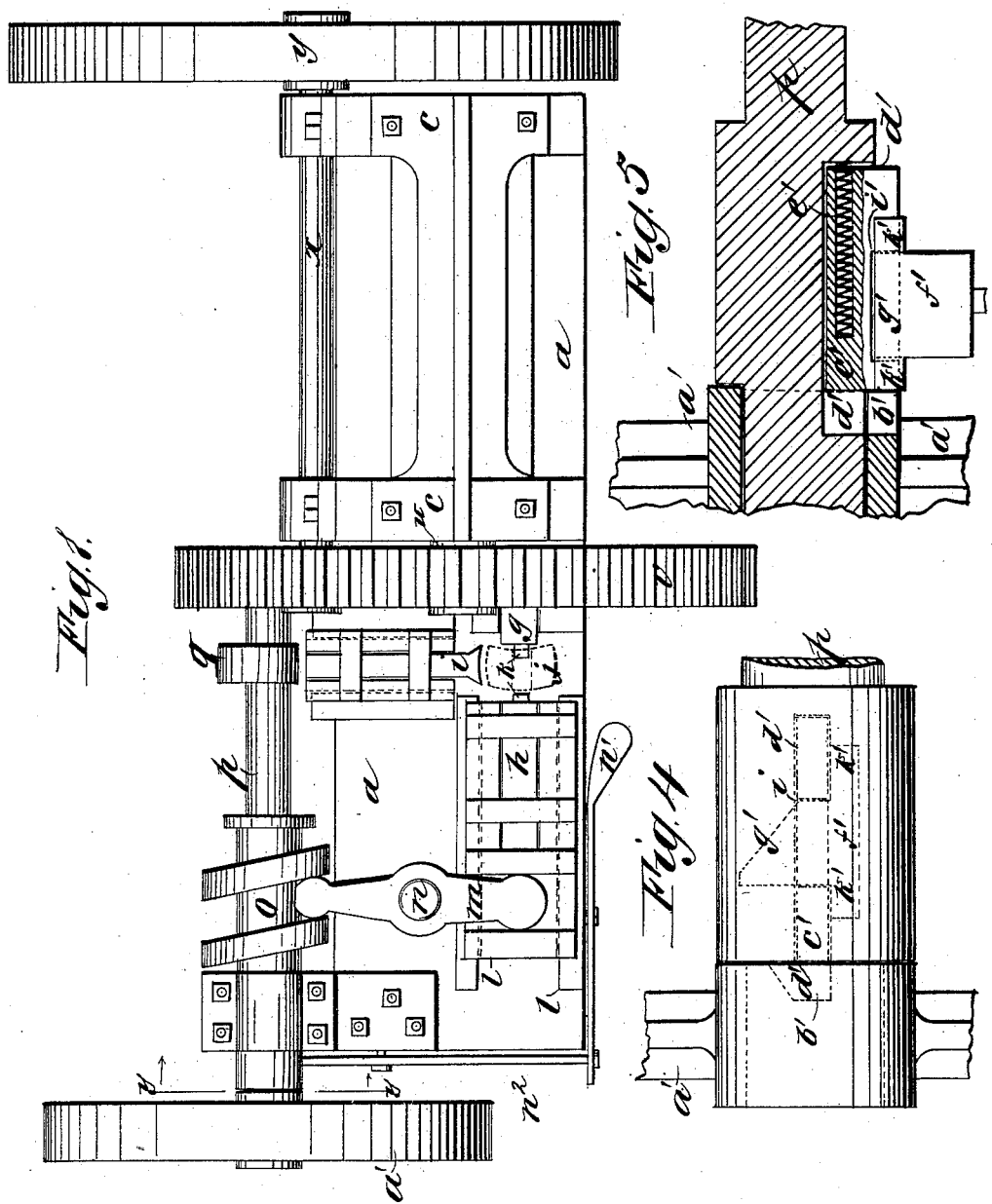

(No Model.) E. YERKES & C. DENN. 3 Sheets—Sheet 3.

MACHINE FOR MAKING AXES.

No. 317,320. Patented May 5, 1885.

WITNESSES:
F. McArdle.
Chas. Lurcott

INVENTOR:
Clayton Denn
Edward Yerkes
BY Munn & Co
ATTORNEYS.

UNITED STATES PATENT OFFICE.

EDWARD YERKES, OF EAST DOUGLASS, MASSACHUSETTS, AND CLAYTON DENN, OF PHILADELPHIA, PENNSYLVANIA.

MACHINE FOR MAKING AXES.

SPECIFICATION forming part of Letters Patent No. 317,320, dated May 5, 1885.

Application filed September 13, 1884. (No model.)

*To all whom it may concern:*

Be it known that we, EDWARD YERKES, of East Douglass, in the county of Worcester and State of Massachusetts, and CLAYTON DENN, of Philadelphia, (Frankford,) in the county of Philadelphia and State of Pennsylvania, have invented a new and Improved Ax and Adz Poll Machine, of which the following is a full, clear, and exact description.

Our invention consists of a simple contrivance by which we combine the press for forging, shaping, punching, and cutting off the heads for axes, adzes, hammers, and other like tools with the ram and dies for shaping the polls and welding on the bits, together with improvements in the contrivances of the poll and bit shaping and welding apparatus, all as hereinafter fully described and claimed.

Reference is to be had to the accompanying drawings, forming part of this specification, in which similar letters of reference indicate corresponding parts in all the figures.

Figure 3:
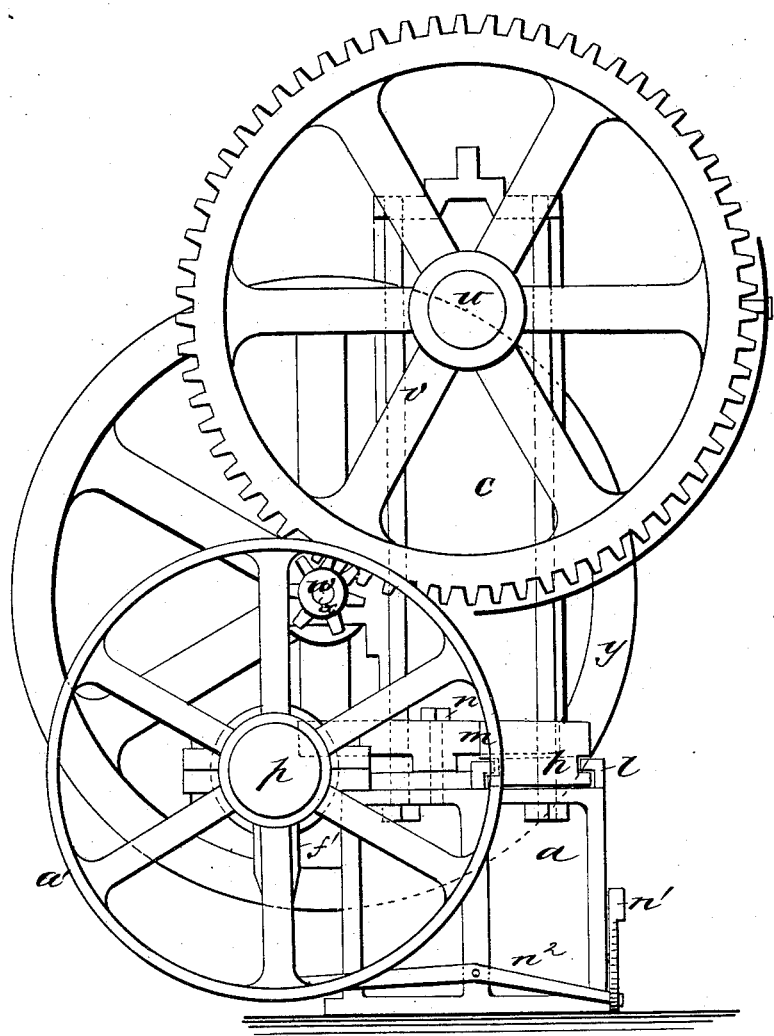
Figure 8:
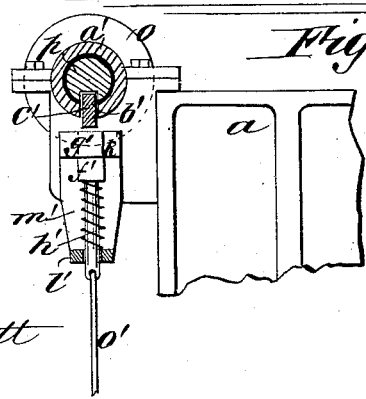

Figure 1 is a plan view of our improved machine. Fig. 2 is a front elevation with a part in section. Fig. 3 is a side elevation. Fig. 4 is a portion of Fig. 1 in larger size, and showing the clutching devices in dotted lines. Fig. 5 is a vertical central section through the parts shown in Fig. 4, and showing the clutch-key withdrawn. Fig. 6 is a vertical section through the main shaft, and showing the same clutched to the driving-pulley. Fig. 7 is a detail cross-sectional view on the line $x\ x$ of Fig. 6, and Fig. 8 is a detail cross-sectional view on the line $y\ y$ of Figs. 1 and 6.

We provide a suitable substantial bed-plate, $a$, and mount on one portion of it—preferably the right-hand side—the anvil-block $b$ and housings $c$ of the press employed for shaping, punching, and cutting off the heads of the tools to be made, said press consisting of the reciprocating die-stock $d$, and means for working the same, in addition to the said anvil-block and housings, said block and stock being adapted for the application of any form of die, hammer, punch, or other tool by keying the same in the grooves $e$, and for the application of cutters by bolting cutter-blades on the projections $f$. On the other or left-hand side of the bed-plate, and in such close proximity to the above-described part of the machine in which the preparatory operations are effected that the operator may transfer the blanks to the finishing mechanism with least effort and in the shortest time, we arrange the stationary holding device or jaw $g$ and reciprocating holding device or jaw $h$, together with the reciprocating ram or hammer-die $i$ for completing the blanks $j$ by holding them by the eye, as represented in Fig. 1, while the ram welds on the steel bit or poll or shapes the same, as the case may be. The holding devices or jaws $g$ and $h$ each have a stud-point, $k$, projecting from the end to enter the eye of the blank, while the ends or shoulders of the dies close firmly against the edges of the blank, and thus securely hold the same while acted on by the ram $i$. The movable device or jaw $h$ is fitted in suitable guideways, $l$, and connected by an articulate joint with the lever $m$, having a fulcrum, $n$, and connected with the grooved cam $o$ on the shaft $p$, to be shifted forward to close on and hold the blank, and to be withdrawn to release the blank. The ram $i$ is arranged with relation to the cam $q$, also on shaft $p$, to be thrust forward to act on the blank. Said ram may be shifted back by the attendant; or a spring or other device may be employed for the purpose. The grooved cam $o$ is so adjusted on the shaft $p$ that it moves device or jaw $h$ up and grips the blank just before the ram is moved forward by cam $q$, and said grooved cam has the usual form for causing the device or jaw $h$ to "dwell" in the position for holding the blank while the ram takes effect on the blank. The press for the preparatory operations may be operated continuously, and the die-stock $d$ is therefore fitted to work in the guides $s$ and connected to eccentrics $t$ on the shaft $u$, to which slow motion is imparted by the large toothed wheel $v$ on it gearing with the pinion $w$ on the more rapidly-moving driving-shaft $x$, carrying the balance-wheel $y$, and to which a suitable pulley will be attached in practice for the driving-belt; but it is important to have the ram $i$ and the holding-dies rest after each operation to allow the attendant sufficient time to remove the finished article and put in the next one to be acted on. We therefore employ a clutch to connect the driving-pulley $a'$ to the shaft $p$, and an automatic tripping mechanism for disconnecting the clutch, in which tripping mechanism we have provided improved means for insuring the stopping of the cams $o$ and $q$ in the positions for the greatest retreat of the device or jaw $h$ and ram $i$ while removing and adjusting the articles being shaped. The clutch consists of the notch $b'$ in the hub of the pulley $a'$, the sliding key $c'$ in the groove $d'$ of the shaft $p$, and the spring $e'$ in the key, all so contrived that when the notch $b'$ comes around to the key the spring $e'$ will thrust the key forward into the notch, and thus clutch the shaft to the pulley, so that said shaft will be set in motion by the pulley, which runs continuously.

The trip mechanism consists of the vertical slide $f'$, having a bevel-edged tongue projection, $g'$, on the upper end, and provided with a spring, $h'$, that raises the slide when said spring is allowed to act, so that a notch, $i'$, in the side of the key $c'$, which projects beyond the surface of the shaft, receives the point of the projection $g'$, the bevel of which, acting on one of the shoulders of the notch $i'$, forces the key back out of the notch $b'$, and thus disconnects the clutch.

The device we employ to insure the stopping of the shaft $p$ and its cams consists of the laterally-projecting studs $k'$ on the head of the slide $f'$ back of the projection $g'$, forming stops against which the portion of the key $c'$ projecting from the groove $d'$ lodge at the moment when the key is shifted back out of the notch $b'$. Without these stops the momentum of the shaft $p$ is liable to carry the key past the tripper-slide, so as to be thrust forward into notch $b'$, and thus cause the shaft to be kept in motion. The tripper-slide is arranged in suitable slideways, $l'$, formed in a bracket, $m'$, attached to the bed-frame, and is connected to a foot-lever, $n'$ $n^2$, by a rod, $O'$, as such trip devices usually are arranged to enable the operator to start the shaft $p$ at will by pressing down the foot-lever. As soon as he has effected the starting of the machine, the operator removes his foot from lever $n'$ to allow spring $h'$ to raise the slide $f'$, ready for tripping the clutch when the shaft $p$ has made its turn as these trip devices commonly work.

It will be seen that by using the grooved cam $o$ and lever $m$ to work the movable holding device or jaw by a jointed connection with said die, we are enabled to arrange said device or jaw to reciprocate in a straight line, by which it holds the tools much better than if arranged rigidly on the lever to swing in the arc of a circle.

Instead of having a stud-point, $k$, on each of the holding devices or jaws $g$ $h$, both to enter the eye of the tool, it is obvious that one device or jaw—say $g$—may have a longer point, and device or jaw $h$ may have a socket to receive the end of said point extending through the eye of the tool, which is an equivalent arrangement. It may also be stated that these holding devices or jaws and the ram $i$ may be made higher, with duplicate operative ends or faces adapted for acting on two tools at once, and said operative ends or faces may be constructed in different forms for tools of different shapes.

Having thus described our invention, what we claim as new, and desire to secure by Letters Patent, is—

1. The stationary holding-jaw, the reciprocating jaw, and the ram, said jaws having holding points or studs, in combination with the rotating cam-shaft, the notched sliding key, and the key shifting and tripping slide, said slide having stop projections, substantially as and for the purpose set forth.

2. The rotating cam-shaft, the notched sliding key, the key tripping and shifting slide, said slide having stop projections, and the centrally-pivoted lever engaging a cam-groove of the cam-shaft, in combination with the stationary and reciprocating jaws or holding devices and the ram, substantially as and for the purpose set forth.

3. In a machine for making axes and other tools, the combination of the notched sliding key $c'$ and the key shifting and tripping slide $f'$, said slide having the stop projections $k'$, adapted to arrest the shaft by lodgment of the keys against said stops when said key is shifted by the bevel-pointed projection $g'$ of said slide $f'$, substantially as described.

EDWARD YERKES.
CLAYTON DENN.

Witnesses to the signature of Edward Yerkes:
   JOSIAH G. ALBERTSON,
   CLAYTON DENN.

Witnesses to the signature of Clayton Denn:
   RICHARD CLARKE,
   THADDEUS STEARNE.